Nov. 28, 1950   F. J. WALLACE   2,532,043
INSTRUMENT FOR RETROGRADE ELECTROSURGICAL RESECTION
Filed June 18, 1946   2 Sheets-Sheet 1
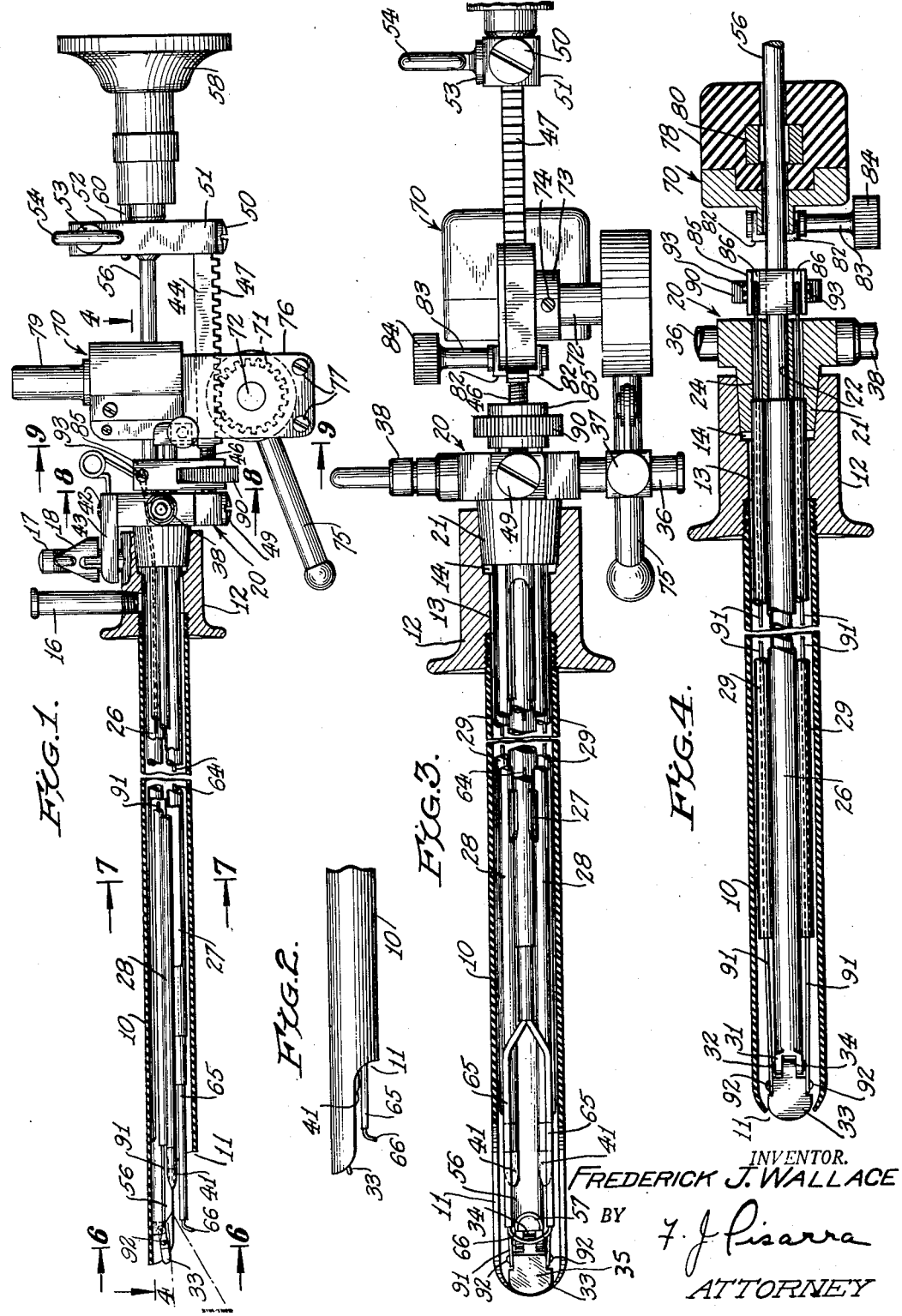
INVENTOR.
FREDERICK J. WALLACE
BY F. J. Pisarra
ATTORNEY

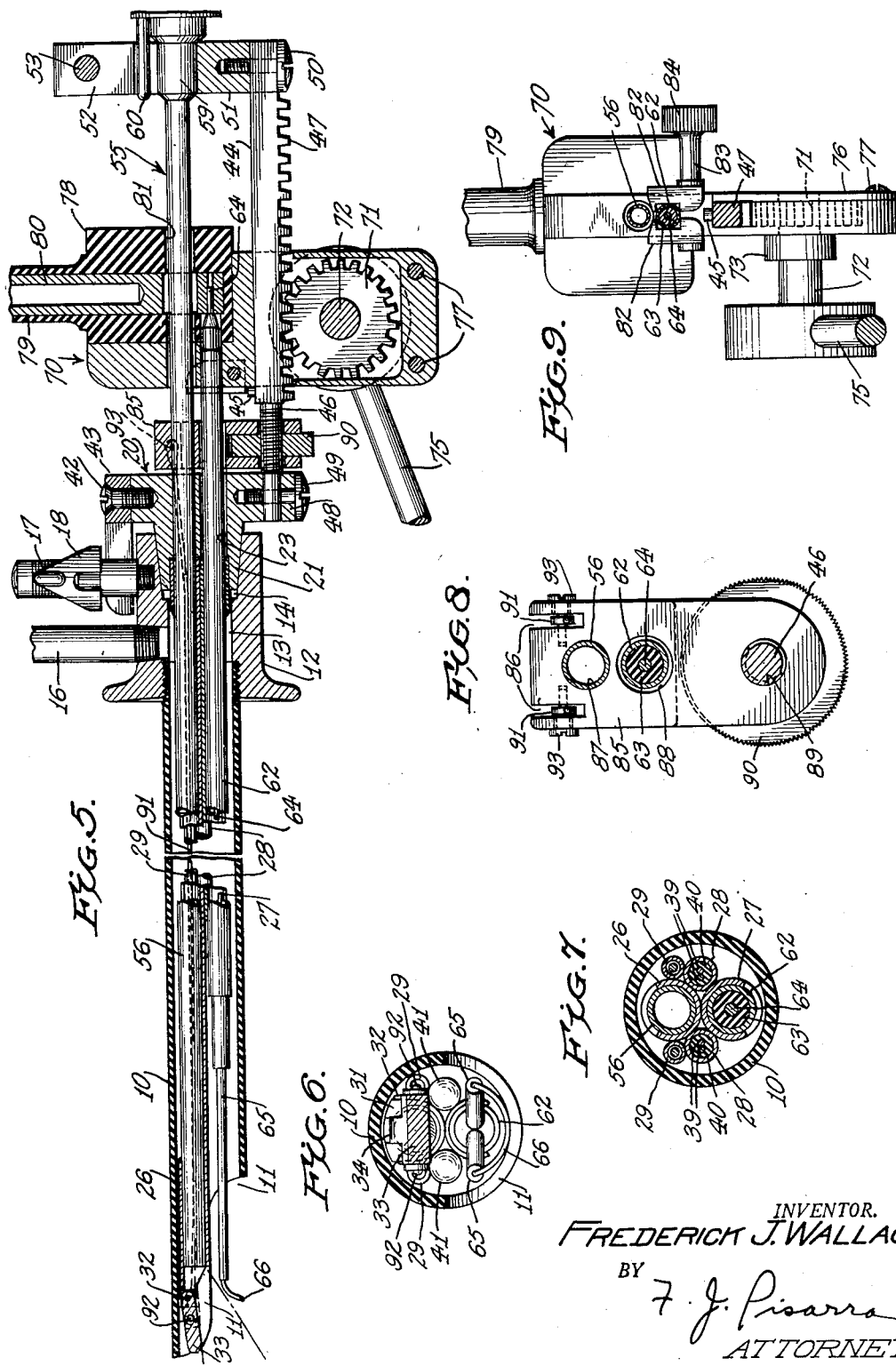

UNITED STATES PATENT OFFICE 2,532,043

INSTRUMENT FOR RETROGRADE ELECTROSURGICAL RESECTION

Frederick J. Wallace, New York, N. Y., assignor to American Cystoscope Makers, Inc., New York, N. Y., a corporation of New York Application June 18, 1946, Serial No. 677,460

4 Claims. (Cl. 128—7)

This invention relates generally to a surgical instrument and has particular reference to such an instrument that is adapted to remove protrusions and tissue growths in body passages and cavities by resection with the aid of a high frequency electric current and under conditions of illuminated retrograde vision. The invention also pertains to a surgical instrument adapted to be advantageously utilized in the examination of body passages and cavities by affording generally forward or retrograde illuminated vision at the will of the operator.

A number of worthwhile advances have been made in comparatively recent years in the art of electrosurgical resection of protrusions and tumorous growths in body passages and cavities. Instruments have been devised whereby such protrusions and growths may be removed by the use of high frequency cutting electrodes manipulated to and fro under observation through a telescope commanding a field of vision forward of or at right angles to its axis. It has been ascertained that excellent results may be obtained in transurethral resections in the majority of instances by employing present-day instruments. On the other hand, conventional instruments do not afford a suitable field of vision or permit the ready removal of protrusions, such as tumors occurring in the immediate vicinity of the bladder neck or tissue growths in that general region.

The instrument of the present invention contemplates and does successfully provide adequate vision and facilitates the removal of protrusions, tumors or tissue growths in the region of the vesical neck of the bladder. As will be apparent to persons skilled in the art from the detailed description that follows, the instrument of this invention may be inserted into a body to the region of the vesical neck of the bladder where a protrusion or the like may be located, whereupon the protrusion may be resected by a high frequency cutting element under conditions of illuminated retrograde vision.

One of the features of the invention resides in the provision of an image reflecting means, preferably consisting of a pivotally mounted mirror, extending ahead of a surgical telescope having a generally forward field of vision. The mirror is tiltable about its axis so as to bring an image of the cutting element and the protrusion lying rearwardly of the objective lens of the telescope into the field of vision of the telescope. In other words, the mirror is positioned directly in front of the objective lens of the telescope lens system, and is tiltable so as to afford a retrograde image of the cutting element and the protrusion to be resected. The mirror is so arranged as to embrace a relatively extensive arc, such as an arc of 170°.

Another feature of the invention is in the provision of a simple, reciprocable mechanism for positively controlling the angular position of the mirror with respect to the axis of the surgical telescope. This mechanism is actuated by a rotary device disposed and manually operated at a point remote from the mirror and in the vicinity of the telescope eyepiece to facilitate its manipulation by the operator.

Another important feature of the invention lies in so arranging the telescope objective lens, the high frequency cutting element and the image reflecting mirror that protrusions or the like may be readily resected under adequate conditions of retrograde vision.

The instrument may be advantageously employed for complete and accurate examination of body cavities, such as the bladder. Upon insertion of the instrument into the bladder, and with the mirror swung out of the field of vision of the telescope, the telescope may be utilized for the direct examination of portions of the bladder lying forwardly of the objective lens. Portions of the bladder lying below and rearwardly of the objective lens may be inspected by tilting the mirror about its axis so as to bring images of such portions of the bladder into the field of vision of the telescope. Also, the instrument permits of the ready location of the two urethral orifices, the trigone, the posterior lip of the vesical orifice, and so on.

It is the primary object of this invention to provide a surgical instrument that is capable of readily removing protrusions, tissue growths and the like, in body passages or cavities, by resection with the aid of a high frequency electric current and under conditions of illuminated rearward or retrograde vision.

Another object of the invention is to provide an electrosurgical instrument for the retrograde resection of tumorous growths in the vicinity of the bladder neck.

This invention has for another object the provision of an instrument adapted to be inserted into a body passage or cavity and having a telescope and image reflecting means so arranged as to permit of generally forward or rearward vision within the passage or cavity at the will of the operator.

A further object of the invention is to provide an instrument of the character indicated wherein a mirror or other image reflecting means is so arranged with respect to the objective lens of a telescope, commanding a generally forward field of vision, as to bring an image of a cutting element positioned outside of the direct field of vision of the telescope into the field of vision of the telescope.

A still further object of the invention is to provided a simple, compact means for imparting pivotal movement to a mirror in an instrument of the character indicated, from a point remote from the mirror.

With the above and other objects in view, the invention comprises the devices, combinations and arrangements of parts set forth in the following detailed description and illustrated in the annexed drawings of a preferred embodiment of the invention, from which the several features of the invention, together with the advantages attainable thereby, will be readily understood by persons skilled in the art.

In the drawings:

Figure 1 is a side elevational view of an instrument constructed in accordance with the invention, partly in central longitudinal cross section, and with parts broken away for better illustration;

Figure 2 is a side elevational view of the front end portion of the instrument illustrated in Figure 1;

Figure 3 is a bottom plan view in enlargement of the instrument shown in Figure 1, partly in central longitudinal cross section, and with parts omitted;

Figure 4 is an enlarged cross-sectional view taken along line 4—4 of Figure 1;

Figure 5 is an enlarged view corresponding to Figure 1, with additional parts in central longitudinal cross section; and Figures 6, 7, 8 and 9 are enlarged views taken, respectively, along lines 6—6, 7—7, 8—8 and 9—9 of Figure 1.

Referring now to the drawings, wherein like reference numerals denote corresponding parts throughout the several views, the instrument illustrated therein includes an endoscopic sheath 10 composed of an electrical insulating material, such as Bakelite, and having a fenestra 11 at its distal end. The rear end of sheath 10 is externally threaded for engagement with corresponding internal threads in a collar 12 to form a liquid-tight connection therewith and to establish communication between the interior of the sheath and a through passage 13 in the collar. As is shown in Figure 5, a portion 14 of passage 13 tapers outwardly in a rearward direction. Collar 12 carries an inlet conduit 16 communicating with passage 13 for the transmission of an irrigating liquid into the interior of sheath 10. Also secured to collar 12 is a threaded post 17 that is provided with a locking attachment 18.

A body 20, best shown in Figures 3, 4 and 5, is machined to obtain a frusto-conical forward portion 21 adapted to be inserted into tapered passage 14 and form a fluid-tight seal therewith. Body 20 is bored to obtain a plurality of through longitudinal passages including a telescope passage 22, an electrode rod passage 23 and a pair of reach rod guide passages 24. Attached to and extending forwardly of body 20 is a unitary cluster of parallel tubular elements (Figures 3 and 7), consisting of a channel or tube 26 adapted to accommodate a telescope, a channel or tube 27 adapted to guide a reciprocatory electrode rod, a pair of lamp carrier tubes 28, and a pair of tubes 29 for supporting and guiding reach rods, all as more fully described further along herein. As will be observed from an examination of Figure 7, tube 26 is contiguous and directly above tube 27, while lamp carrier tubes 28 are immediately adjacent and on opposite sides of a plane common to the axis of tubes 26 and 27. Also, guide tubes 29 lie along opposite sides of tube 26, the axes of the guide tubes and tube 26 being substantially in a common plane. The form of construction just described results in a compact assemblage of tubular elements that may be readily inserted into and withdrawn from the interior of an endoscopic sheath, and that cooperates with other devices in the successful fulfilment of the objects of the invention.

The forward extremity 31 of channel or tube 26 is bifurcated, as shown in Figures 4 and 6, and carries a through pivot pin 32 that is in a plane normal to the axis of this tube. A mirror or other image reflecting means 33 has an integral tongue 34 that is positioned in bifurcated extremity 31 of tube 26 and is pivotal about the axis of pin 32. It is recommended that mirror 33 be made of a suitable corrosion-resisting metal capable of being highly polished to obtain a surface 35 (Figure 3) having excellent image reflecting properties.

Turning back to body 20, the same carries a conduit 36 for withdrawing irrigating liquid from the instrument, as allowed by a petcock 37. Also mounted on body 20 is an electrical contact terminal 38 adapted to be connected to a suitable source of electrical energy (not shown) for transmitting the electrical energy to electrical conductors 39 in tubes 28. As is most clearly shown in Figure 7, conductors 39 are maintained out of contact with tubes 28 by being imbedded in sheaths of suitable insulating material 40. A miniature cartridge type electric lamp 41 is secured to the foremost end of each tube 28 and is energized by the current transmitted through contact terminal 38 and conductors 39. Affixed to body 20 by a screw 42 is a bifurcated lock arm 43 (Figures 1 and 5) which receives post 17 and is engaged by locking attachment 18, whereby body 20 and associated parts are detachably secured to collar 12.

A supporting bar 44, shown in detail in Figure 5, is machined intermediate its ends to obtain an upstanding stop element 45, a threaded shaft 46 and a rack 47. The forward end of bar 44 is received in a lug 48 integral with body 20 and is secured thereto by a screw 49. A like screw 50 connects the rearward end of bar 44 to the free end of an arm 51 that has a split clamping sleeve 52 which carries a clamping screw 53 having a wing head 54.

A surgical telescope, generally indicated by numeral 55, comprises a tubular stem 56 that contains a lens system including an objective lens 57 (Figure 3). The remainder of the lens system (not shown) may be of any suitable type, such as, for example, the lens system disclosed in the patent to R. H. Wappler 1,680,490, granted August 14, 1928. At the rear of tubular stem 56 is a conventional eyepiece 58 (Figure 1) adjacent which is a collar of intermediate diameter 59 and an aligning pin 60. When the instrument is assembled, as illustrated in several of the views, collar 59 and aligning pin 60 are disposed within clamping sleeve 52 and are secured thereto by the clamping action of screws 53 which is manually operated into and out of clamping position through the medium of wing head 54.

A hollow shaft 62 is adapted to be inserted into channel or tube 27 and longitudinally reciprocated therein. Shaft 62 contains a mass of insulating material 63 within which an electrically conductive rod 64 is centrally imbedded. Conductive rod 64 merges at its forward end with two forwardly divergent arms 65, each of which is ensheathed in a suitable insulating material. Arms 65 terminate at their forward extremities in a generally transverse uninsulated electrically conductive cutting element 66. The rear end portion of conductive rod 64 is free of insulating material, as shown in Figure 5.

A housing, generally denoted by numeral 70, is slidably mounted upon bar 44 and contains a pinion 71 that is secured to and rotatable with a shaft 72 and meshes with rack 47. A collar 73, affixed to shaft 72 by a set screw 74 (Figure 3), restrains the shaft against movement in one direction, for example, toward the right, as viewed in Figure 9. A lever 75, for imparting rotation to pinion 71, is attached to the outer end of shaft 72. Access to the interior of the housing and to pinion 71 may be gained by removing a cover plate 76 after attaching screws 77 are withdrawn.

A block of insulating material 78, such as hard rubber, is carried by housing 70 and accommodates a binding post 79 having an electrically conductive core 80 adapted to be connected to a suitable source of high frequency electric current (not shown). As is shown in Figure 5, pinion 71 meshes with rack 47, and upon rotation of the pinion, housing 70 and block 78, may be moved to and fro along bar 44. When the parts are in the relative position shown in Figure 5, the front edge of housing 70 abuts stop 45, thereby limiting forward travel of the housing and associated devices with respect to bar 44 and sheath 10. In other words, Figure 5 shows the parts in their forwardmost position. Upon rotating lever 75 in a counter-clockwise direction, as viewed in Figure 5, the housing is moved rearwardly along bar 44.

Telescope stem 56 is adapted to be passed through and maintained out of direct contact with a passage 81 extending through housing 70, block 78 and core 80. The rear portion of hollow shaft 62 extends into housing 70, and the uninsulated rear extremity of conductive rod 64 projects into and is in intimate contact with core 80. Hollow shaft 62 is releasably secured to housing 70 by a pair of chuck jaws 82 carried on opposite sides of the housing and movable into and out of shaft-engaging position by a screw 83 having a serrated actuating head 84, as best shown in Figure 9. It will be apparent that jaws 82 may be tightened or loosened, as required, for the purpose of clamping or releasing the jaws to or from the hollow shaft. In this manner, operative engagement of the hollow shaft and, therefore, conductive rod 64 may be quickly and easily effected, as desired.

A mechanism arranged for cooperation with mirror 33 and bar 44 for positively controlling the angular position of the mirror with respect to the axis of the surgical telescope will now be described, reference being had particularly to Figures 3, 4, 5 and 8. This mechanism comprises a body 85 bifurcated at its lower end and having a pair of spaced parallel slots 86 at its upper end. Body 85 is provided with a plurality of through apertures 87, 88 and 89 for respectively and freely accommodating telescope stem 56, hollow shaft 62 and threaded shaft 46 of bar 44. An externally serrated control nut 90 engages with threaded shaft 46 and is positioned within the bifurcated lower end of body 85. Rotation of nut 90 effects forward or rearward movement thereof with respect to threaded shaft 46, depending upon the direction of rotation, to thereby impart corresponding forward or rearward movement to body 85. A reach rod 91, longitudinally slidable in each rod passage 24 and in a corresponding guide tube 29, is pivotally secured at its distal end to mirror 34, as indicated at 92, and is pivotally connected at its rearward end to a stud 93 carried by body 85 and extending across a corresponding slot 86. Thus, as body 85 is retracted or moved toward the right, as viewed in Figure 5, in response to rotation of nut 90 in one direction, reach rods 91 are also retracted and tilt mirror 33 in a counter-clockwise direction about pivot pin 32. Similarly, reach rods 91 coact with mirror 33 and body 85 to swing the mirror in a clockwise direction to the position shown in Figures 1 and 5, upon rotation of nut 90 in the opposite direction.

The field of vision of surgical telescope 55 is conical, in a direction forward and obliquely downward of the axis of the telescope, as represented by the dash lines in Figures 1 and 5. The various devices of the assembled instrument are so arranged that mirror 33 may be swung into and out of the field of vision of the telescope, while cutting element 66 is at all times outside of the direct field of vision of the telescope. When mirror 33 is actuated by the control mechanism and placed in the field of vision of the telescope, it brings an image of cutting element 66 into the field of vision of the telescope and permits the operator to view the protrusion or tissue growth as it is being resected by the instrument under conditions of adequate illumination supplied by lamps 41, arranged rearwardly of objective lens 57 in the region of fenestra 11.

From the foregoing, it is believed that the construction, operation, and advantages of my present invention will be readily comprehended by persons skilled in the art. It is to be clearly understood, however, that the form of my invention herewith shown and described is to be taken as a preferred example of the same and that various changes in the shape, size and arrangement of parts may be resorted to without departing from the spirit of my invention as defined by the appended claims.

I claim:

1. In an instrument of the character described, an endoscopic sheath, a telescope in the sheath and including an objective lens commanding an obliquely forward field of vision, a lamp within the sheath and positioned rearward of the objective lens, an electrode rod mounted for longitudinal movement in the sheath and including a cutting element outside of the direct field of vision of the telescope, reflecting means pivotally connected to the telescope and positioned forwardly of the objective lens and the cutting element for bringing an image of the cutting element into the field of vision of the telescope, means coacting with the reflecting means to place the same into and out of the field of vision of the telescope, and means connected to the electrode rod for imparting reciprocation thereto.

2. In an instrument of the character described, an endoscopic sheath, a telescope in the sheath and including an objective lens commanding an obliquely forward field of vision, a lamp within the sheath and positioned rearward of the objective lens, an electrode rod mounted for longitudinal movement in the sheath and including a cutting element outside of the direct field of vision of the telescope, a single mirror positioned forwardly of the objective lens, the lamp and the cutting element and pivotally mounted at its rear end so as to be movable from a generally longitudinal position into positions of varying obliquity with respect to the axis of the telescope to bring an image of the cutting electrode into the field of vision of the telescope, means coacting with the mirror to place the same into and out of the field of vision of the telescope, and means connected to the electrode rod for imparting reciprocation thereto.

3. In an instrument of the character described, an endoscopic sheath, a telescope in the sheath and including an objective lens commanding an obliquely forward field of vision, an electrode rod reciprocable along a path parallel to the axis of the telescope and including a cutting element positioned to one side of the telescope and outside of the direct field of vision thereof, a single mirror positioned forwardly of the objective lens and pivotal about an axis adjacent the side of the telescope remote from the cutting element, said mirror being so arranged as to be movable from a generally longitudinal position into positions of varying obliquity with respect to the axis of the telescope to bring an image of the cutting element into the field of vision of the telescope, means coacting with the mirror to place the same into and out of the field of vision of the telescope, and means connected to the electrode rod for imparting reciprocation thereto.

4. In an instrument of the character described, an endoscopic sheath having a lateral fenestra, a telescope in the sheath and including an objective lens commanding an obliquely forward field of vision through the fenestra, an electrode rod reciprocable along a path parallel to the axis of the telescope and intermediate said axis and the fenestra, said electrode rod including a cutting element positioned to the fenestra side of the telescope and outside of the direct field of vision thereof, a single mirror positioned forwardly of the objective lens and pivotal about an axis adjacent the side of the telescope remote from the cutting element, said mirror being so arranged as to be movable from a generally longitudinal position into positions of varying obliquity with respect to the axis of the telescope to bring an image of the cutting element into the field of vision of the telescope, means coacting with the mirror to place the same into and out of the field of vision of the telescope, and means connected to the electrode rod for imparting reciprocation thereto.

FREDERICK J. WALLACE.

REFERENCES CITED

The following references are of record in the file of this patent:

UNITED STATES PATENTS

| Number | Name | Date |
| --- | --- | --- |
| 1,459,313 | Reisler et al. | June 19, 1923 |
| 2,002,595 | Wappler | May 28, 1935 |
| 2,038,393 | Wappler | Apr. 21, 1936 |
| 2,120,996 | Wappler | June 21, 1938 |
| 2,129,391 | Wappler | Sept. 6, 1938 |

FOREIGN PATENTS

| Number | Country | Date |
| --- | --- | --- |
| 298,192 | Great Britain | Sept. 19, 1929 |